(12) United States Patent
Power, II et al.

(10) Patent No.: US 11,351,405 B2
(45) Date of Patent: Jun. 7, 2022

(54) SAFETY HARNESS BRIDGE ROPE ENGAGEMENT SYSTEM

(71) Applicant: Tethrd LLC, Jordan, MN (US)

(72) Inventors: Walter Ernest Power, II, Jordan, MN (US); Gregory Alan Godfrey, Richmond Hill, GA (US); Carl Eugene Kossuth, III, Jordan, MN (US); Jared Owen Shaffer, Fairmont, WV (US)

(*) Notice: Subject to any disclaimer, the term of this patent is extended or adjusted under 35 U.S.C. 154(b) by 413 days.

(21) Appl. No.: 16/445,406

(22) Filed: Jun. 19, 2019

(65) Prior Publication Data

US 2020/0398087 A1 Dec. 24, 2020

(51) Int. Cl.
*A62B 35/00* (2006.01)
*A01M 31/02* (2006.01)

(52) U.S. Cl.
CPC ......... *A62B 35/0012* (2013.01); *A01M 31/02* (2013.01); *A62B 35/0025* (2013.01)

(58) Field of Classification Search
CPC ..... A62B 35/0012; A01M 31/02; A63B 27/00
See application file for complete search history.

(56) References Cited

U.S. PATENT DOCUMENTS

| | | | | |
|---|---|---|---|---|
| 11,077,004 B2* | 8/2021 | Arnold | ................ | A63B 29/02 |
| 2018/0369621 A1* | 12/2018 | Blondeau | ............. | A63B 29/02 |
| 2019/0105521 A1* | 4/2019 | Roger | ............. | A62B 35/0037 |
| 2020/0324153 A1* | 10/2020 | Power, II | .......... | A62B 35/0025 |
| 2020/0398087 A1* | 12/2020 | Power, II | .......... | A62B 35/0012 |
| 2020/0398088 A1* | 12/2020 | Power, II | .......... | A62B 35/0012 |
| 2021/0101032 A1* | 4/2021 | Power, II | .......... | A62B 35/0012 |
| 2021/0178200 A1* | 6/2021 | Power, II | .............. | A63B 27/00 |
| 2021/0178201 A1* | 6/2021 | Power, II | ............. | A01M 31/02 |
| 2021/0228923 A1* | 7/2021 | Power, II | .......... | A62B 35/0037 |

* cited by examiner

*Primary Examiner* — Brian D Mattei
*Assistant Examiner* — Kathleen M. McFarland

(57) ABSTRACT

A safety harness bridge rope engagement system includes a harness and a pair of bridge connectors attached to the harness. The bridge connectors are configured to engage a bridge rope. Each of the bridge connectors has a plurality of channels therein. One of the channels is selected to receive a bridge rope to retain the bridge rope at the selected location to adjust the point of pressure between the harness and user of the harness.

7 Claims, 6 Drawing Sheets

SAFETY HARNESS BRIDGE ROPE ENGAGEMENT SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to a harness adjustment device and more particularly pertains to a new harness adjustment device for allowing a person to choose where a pressure point exists between the harness and the person wearing the harness. In this manner the user can move the pressure point from the back of the upper legs to the lower back and to points therebetween.

(2) Description of Related Art Including Information Disclosed Under 37 CFR 1.97 and 1.98

The prior art relates to harnesses in general wherein a person may be seated within the harness for an extended amount of time such that adjustability of the positioning of the harness will enhance the comfort of the harness. While such adjustable harnesses may be utilized for multiple purposes, one purpose for which they may be particularly useful is for hunting from a tree.

BRIEF SUMMARY OF THE INVENTION

An embodiment of the disclosure meets the needs presented above by generally comprising a harness and a pair of bridge connectors attached to the harness. The bridge connectors are configured to engage a bridge rope. Each of the bridge connectors has a plurality of channels therein configured to receive and frictionally engage a bridge rope.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
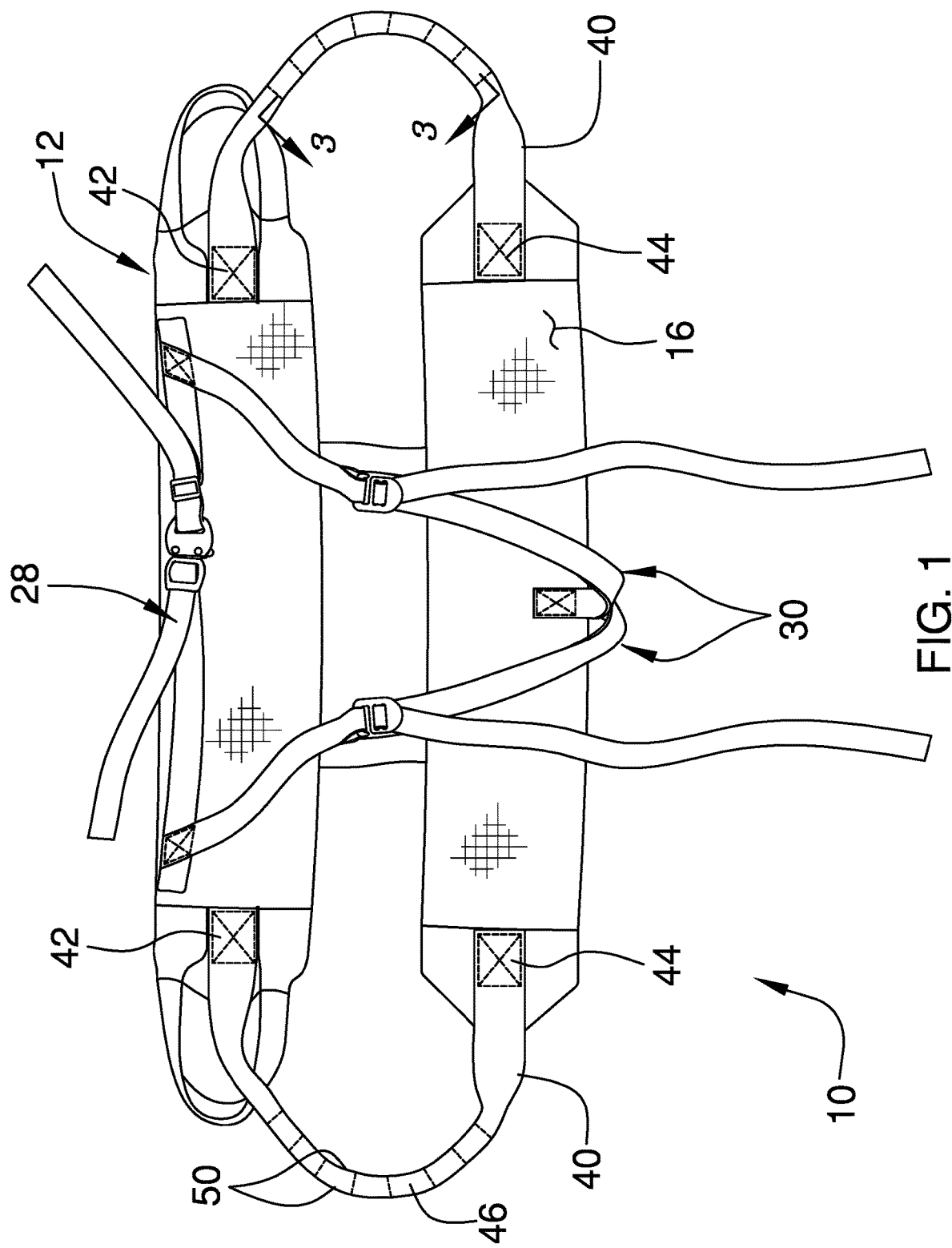
FIG. 1 is a front view of a safety harness bridge rope engagement system according to an embodiment of the disclosure.
Figure 2:
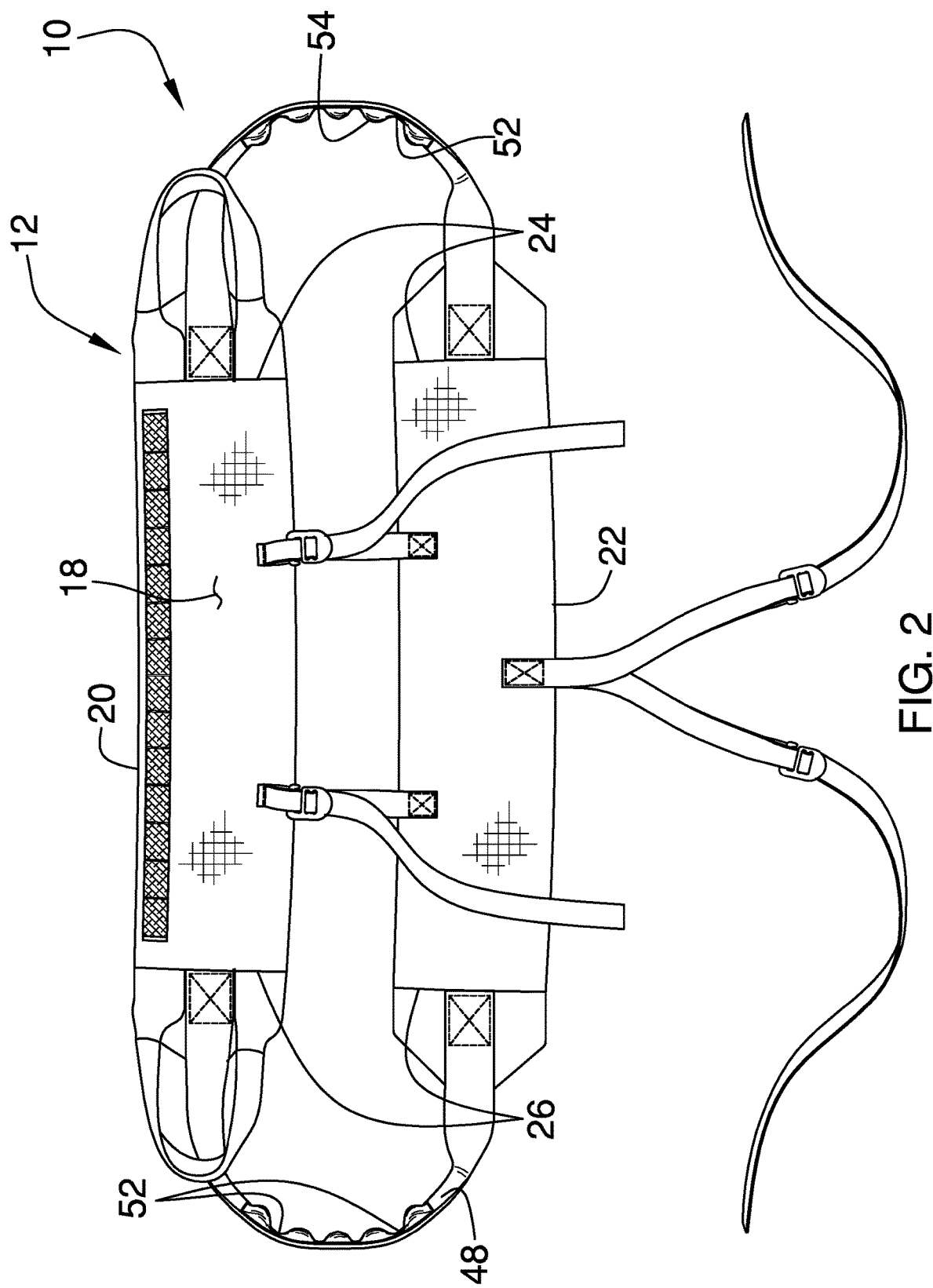
FIG. 2 is a rear view of an embodiment of the disclosure.

With reference now to the drawings, and in particular to FIGS. 1 through 6 thereof, a new harness adjustment device embodying the principles and concepts of an embodiment of the disclosure and generally designated by the reference numeral 10 will be described.

As best illustrated in FIGS. 1 through 6, the safety harness bridge rope engagement system 10 generally includes a safety harness 12 of generic construction which includes a cradle 14 having a front side 16, a rear side 18, a top edge 20, a bottom edge 22, a first lateral edge 24 and a second lateral edge 26. The front side 16 of the cradle 14 is configured to be positionable against a lower back 72 and the upper legs 74 of a person 70. Typical harnesses used for tree hunting further include a waist belt 28 that is attached to the cradle 14 as well as a pair of leg straps 30.

While the Figures depict one type of safety harness having two-piece cradle, the invention herein may be utilized with all conventional harnesses which utilize a pair of bridge connectors 32. The bridge connectors 32 are attached to the cradle 14 and are configured to engage a bridge rope 34. The bridge rope 34 is a rope that extends between the safety harness 12 and a tree line 36 secured to a tree 38. One of the bridge connectors 32 is attached to the first lateral edge 24 and one of the bridge connectors 32 is attached to the second lateral edge 26.

Figure 4:
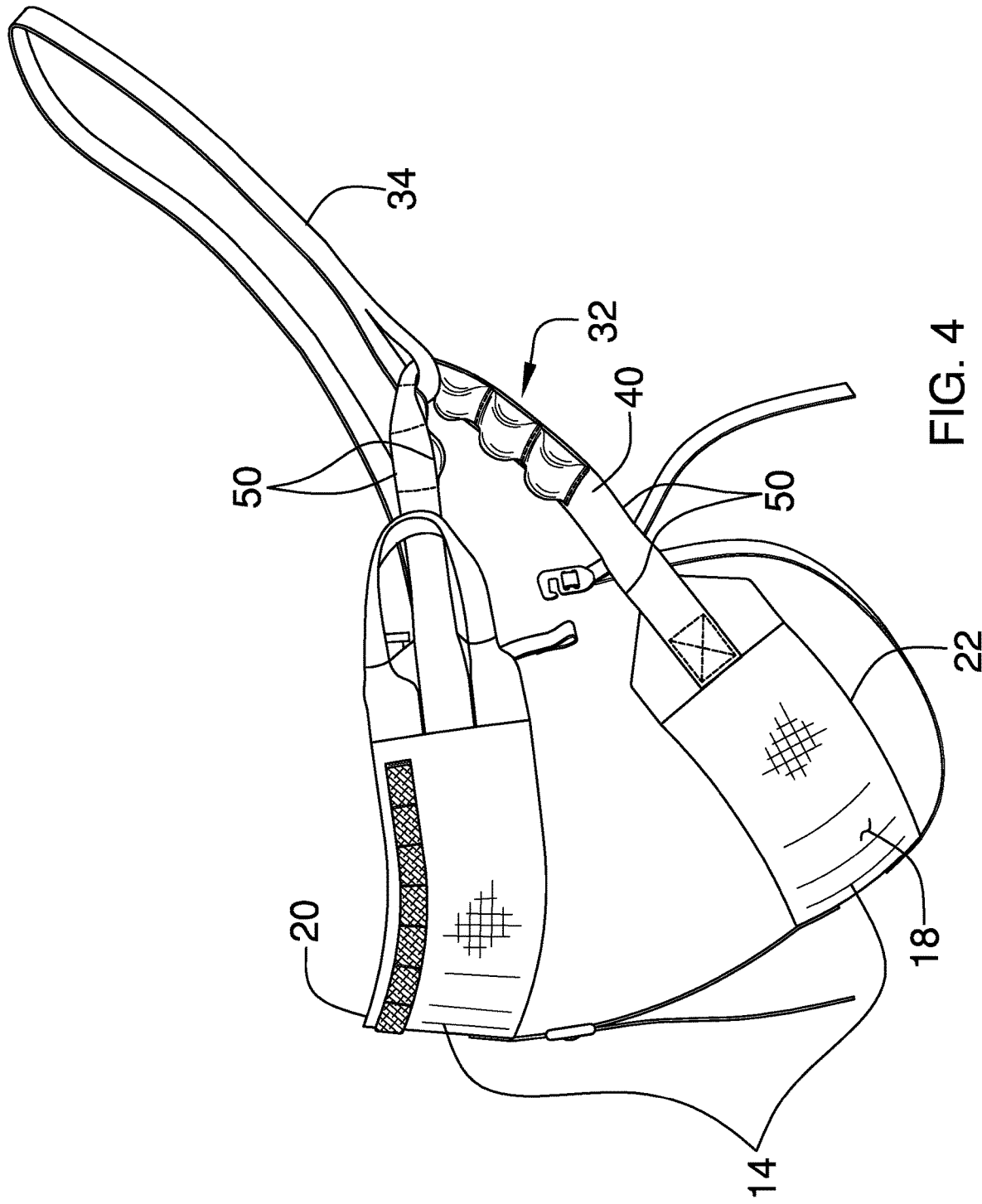
FIG. 4 is a side view of an embodiment of the disclosure.
Figure 5:
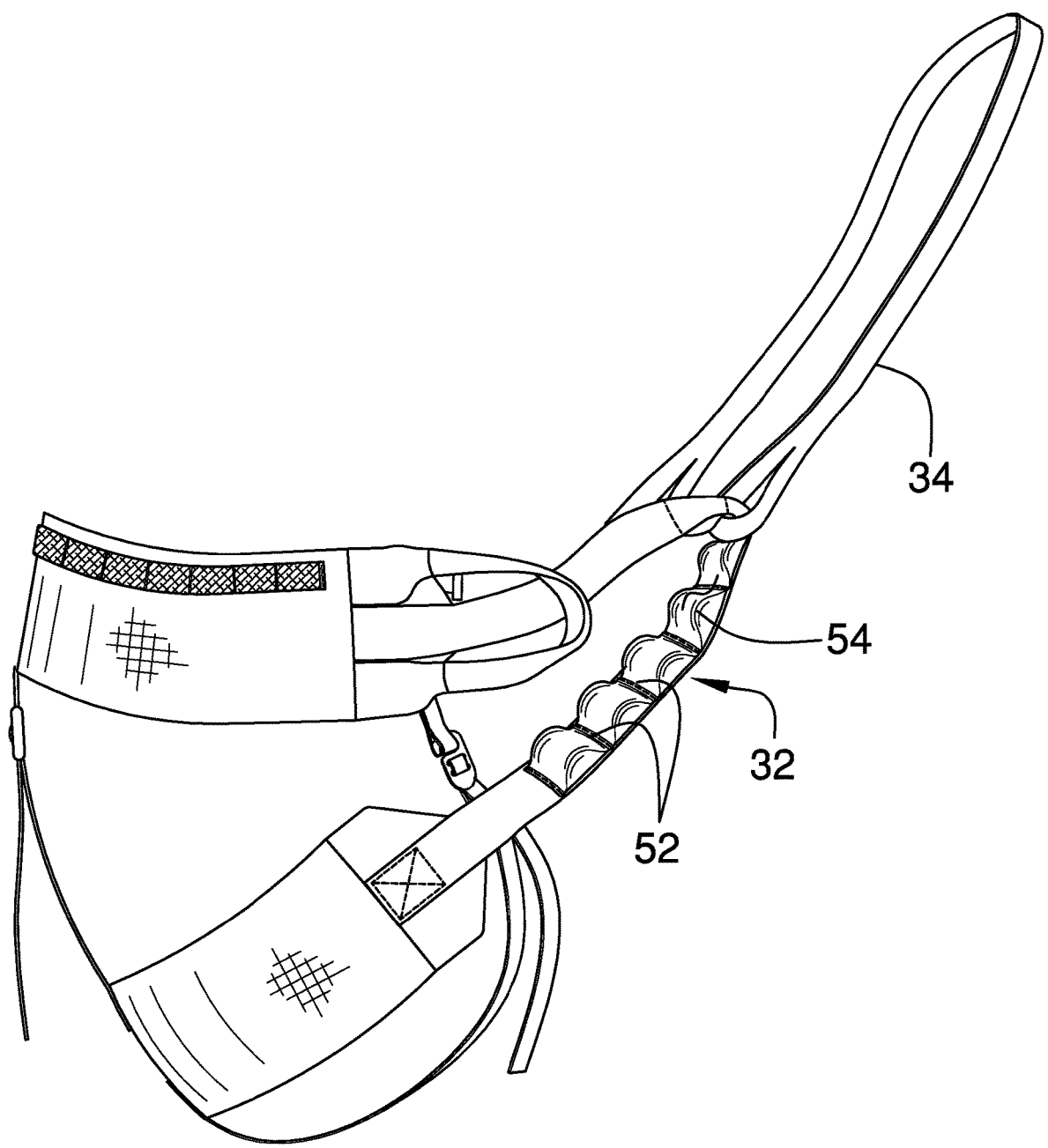
FIG. 5 is a side view of an embodiment of the disclosure.
Figure 6:
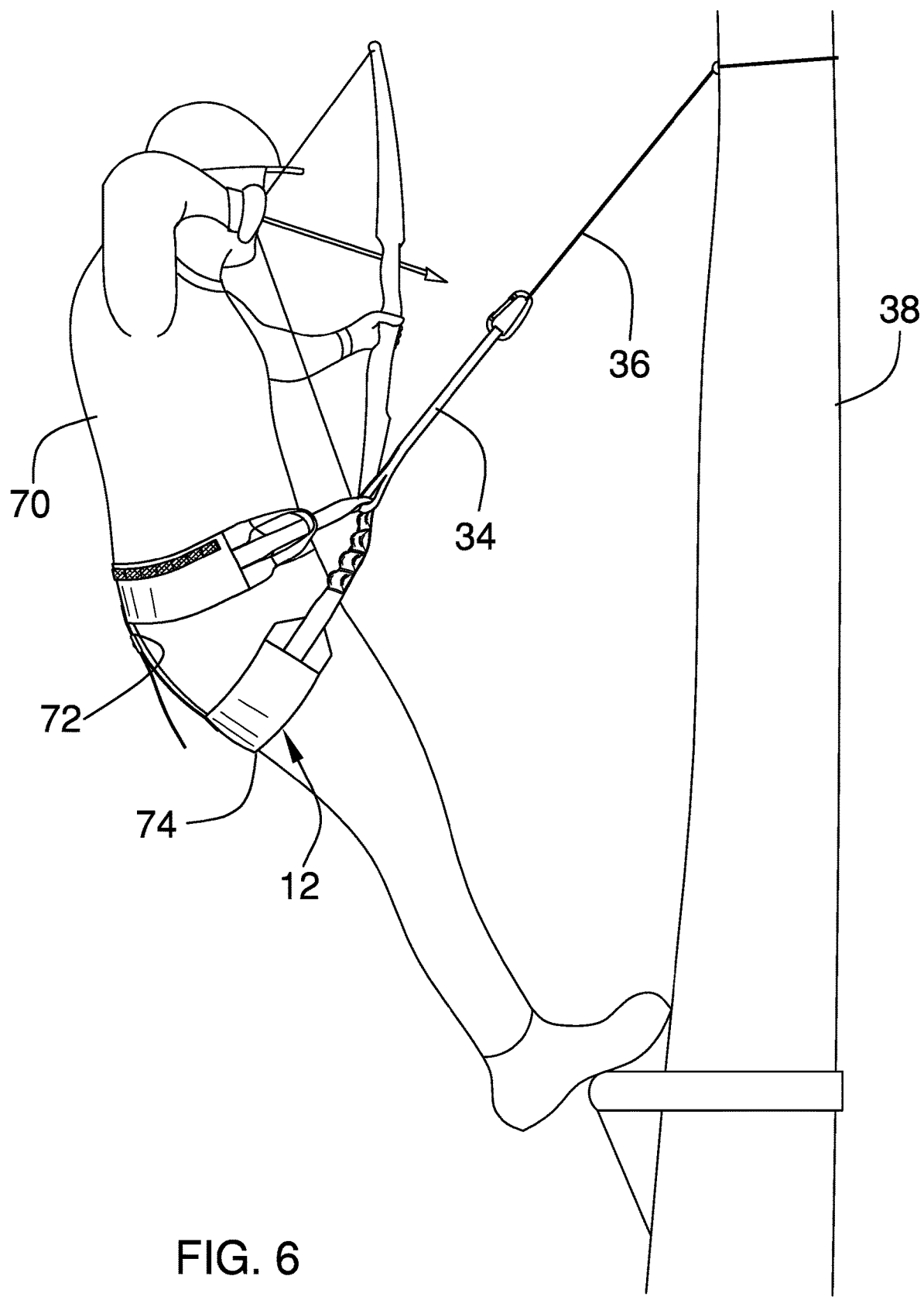
FIG. 6 is a side in-use view of an embodiment of the disclosure.

More specifically, each of the bridge connectors 32 comprises a strap 40 that has a first end 42, a second end 44, an outer surface 46, an inner surface 48, and a pair of opposed edges 50. The strap 40 is flexible and may be comprised of conventional strap material used for safety harnesses. The first end 42 is positioned nearer to the top edge 20 than the bottom edge 22 and the second end 44 is positioned nearer to the bottom edge 22 than the top edge 22. The inner surface 48 defines an interior surface of a loop formed between the strap 40 and the cradle 14. That is, the inner surface 48 faces its associated first 24 or second 26 lateral edge of the cradle 14 such that the inner surface 48 is configured to abut against and frictionally engage the bridge rope 34 as is shown in FIGS. 4-6.

A plurality of channels 52 is formed in the inner surface 48. The channels 52 are configured to receive the bridge rope 34 such that the bridge rope 34 remains in a selected one of the channels 52. As can be seen in FIG. 4 through FIG. 6, when tension is placed on the bridge connectors 32 and bridge rope 34, the bridge rope 34 will slide into one of the channels 52 and will not be movable out of the channel 52 in which it is placed due to the frictional and gravitational forces placed at the juncture of the bridge rope 34 and bridge connector 32. The channels 52 extend between and through the opposed edges 50 and are spaced laterally from each other from the first end 42 to the second end 44. The number of channels 52 may vary but will typically include at least four channels 52 and may be positioned entirely along the length of the strap 40 from the first end 40 to the second end 44 or may only be positioned on a central area of the strap 40.

Figure 3:
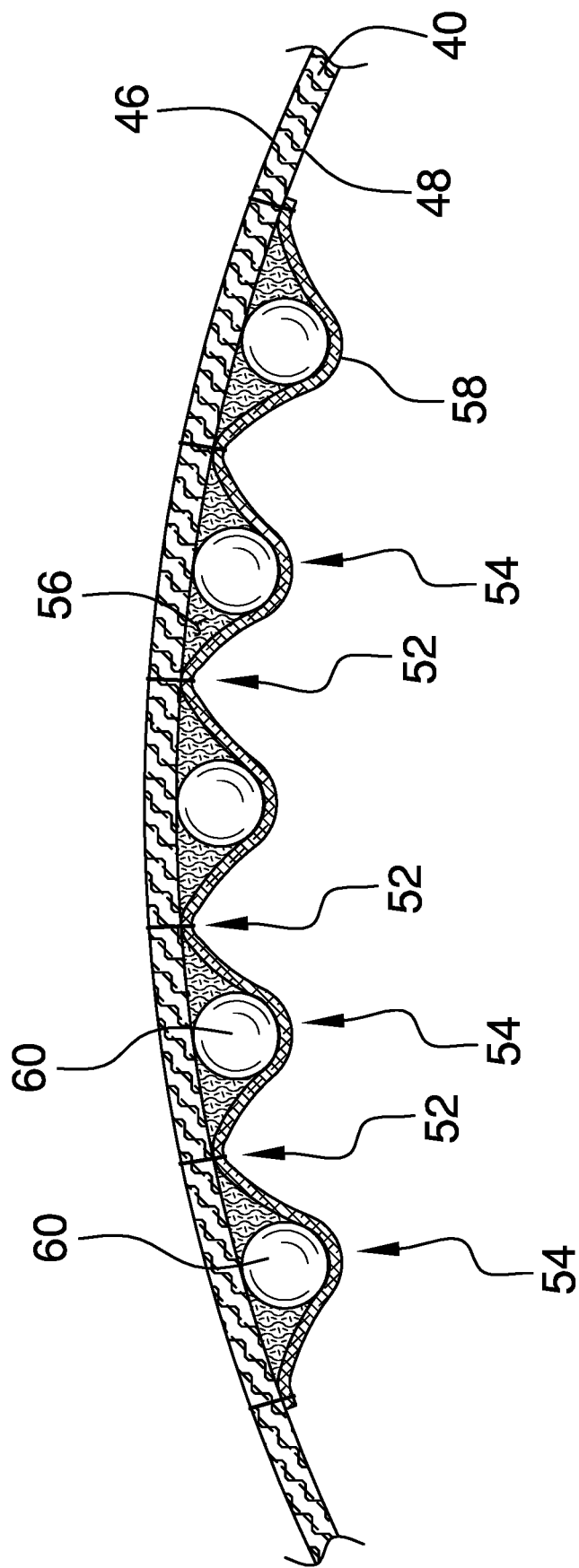
FIG. 3 is a cross-sectional view of a bridge connector of an embodiment of the disclosure taken along line 3-3 of FIG. 1.

The channels 52 may be formed in any number of ways by creating raised areas 54 in the inner surface 48 such that the channels 52 are positioned between the raised areas 54. Alternatively, a channel 52 containing panel may be attached to and become part of the strap 40 such that the panel supplies the channels 52. Channels 52 may also be formed by crimped areas of fabric held in place with stitching. In one embodiment, an interior space 56 is defined between the outer surface 46 and the inner surface 48. As can be seen in FIG. 3, the inner surface 48 may be formed by an outer wall 58 secured to the strap 40 to form a portion of the strap 40. Within the interior space 56 may be positioned any article or material which substantially holds its shape to form the raised areas 54. For example, a plurality of rigid members 60 may be used in the interior space 56. The rigid members 60 push against the outer wall 58 to urge it outwardly and form the raised areas 54 on the inner surface 48. The rigid members 60 may have a convexly arcuate surface so that the raised areas 54 are rounded. The rigid members 60 may further have a spherical shape and be comprised of metallic balls, such as conventional ball bearings for example. While the channels 52 and raised areas 54 may have curved shape, it should be understood that angular shapes, such as rectangular or triangular raised areas 54 and channels 52 may be utilized instead. Thus, the rigid members 60 may include any shape which facilitates the formation of fixed channels to receive and retain the bridge rope 34 where desired.

In use, the harness 12 is used in a conventional manner to provide safety to a person utilizing such while standing on a foot platform type tree strand. However, the channels 52 allow the user to move the bridge rope 34 where desired on the bridge connector 32. By moving the bridge rope 34 toward the top edge 20 of the harness 12, i.e. the first end 42 of the strap, the user's weight is moved toward the lower back 72. When the bridge rope 34 is moved toward the bottom edge 22, i.e. the second end 44 of the strap 40, the person's weight is moved toward the back of the legs 74. The channels 52 prevent the bridge rope 32 from moving once a desired location is chosen by the user. The ability to adjust the weight pressure points experienced by the user results in much greater comfort for the user who may be in the safety harness 12 for extended periods of time up to and including multiple hours.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A safety harness bridge rope locking system for allowing a person to retain a bridge rope at a selected position on a safety harness, the safety harness bridge rope locking system comprising:
   a harness;
   a pair of bridge connectors being attached to the harness and being configured to engage a bridge rope, each of the bridge connectors having a plurality of channels therein configured to receiving and frictionally engage a bridge rope;
   wherein each of the bridge connectors comprises:
     a strap having a first end, a second end, an outer surface, an inner surface, and a pair of opposed edges, the first end being positioned nearer to a top edge of the harness than a bottom edge, the second end being positioned nearer to the bottom edge than the top edge,
     the inner surface defining an interior surface of a loop formed between the strap and the harness, the inner surface being configured to abut against and frictionally engage a bridge rope, and
     the plurality of channels being formed in the inner surface, wherein the channels extend between and through the opposed edges, wherein the channels are spaced laterally from each other from the first end to the second end; and
   wherein the strap of each of the bridge connectors further comprises:
     an interior space being defined between the outer surface and the inner surface, and
     a plurality of rigid members being positioned within the interior space, the rigid members forming raised areas on the inner surface wherein the channels are formed between the raised areas.

2. The safety harness bridge rope locking system according to claim 1, wherein the rigid members each have a convexly arcuate surface.

3. The safety harness bridge rope locking system according to claim 1, wherein the rigid members each have a spherical shape.

4. A safety harness bridge rope locking system for allowing a person to retain a bridge rope at a selected position on a safety harness, the safety harness bridge rope locking system comprising:
   a cradle having a front side, a rear side, a top edge, a bottom edge, a first lateral edge and a second lateral edge, the front side of the cradle being configured to be positionable against a lower back and upper legs of a person;
a pair of bridge connectors being attached to the cradle and being configured to engage a bridge rope, each of the bridge connectors having a plurality of channels therein configured to receiving and frictionally engage a bridge rope, wherein one of the bridge connectors is attached to the first lateral edge and one of the bridge connectors is attached to the second lateral edge;
a waist belt being attached to the cradle;
a pair of leg straps being attached to the cradles; and
wherein each of the bridge connectors comprises:
- a strap having a first end, a second end, an outer surface, an inner surface, and a pair of opposed edges, the first end being positioned nearer to the top edge than the bottom edge the second end being positioned nearer to the bottom edge than the top edge,
- the inner surface defining an interior surface of a loop formed between the strap and the cradle, the inner surface being configured to abut against and frictionally engage a bridge rope, and
- the plurality of channels being formed in the inner surface, wherein the channels extend between and through the opposed edges, wherein the channels are spaced laterally from each other from the first end to the second end.

5. The safety harness bridge rope locking system according to claim 4, wherein the strap of each of the bridge connectors further comprises:
an interior space being defined between the outer surface and the inner surface;
a plurality of rigid members being positioned within the interior space, the rigid members forming raised areas on the inner surface wherein the channels are formed between the raised areas.

6. The safety harness bridge rope locking system according to claim 5, wherein the rigid members each have a convexly arcuate surface.

7. The safety harness bridge rope locking system according to claim 5, wherein the rigid members each have a spherical shape.

* * * * *